United States Patent
Montero et al.

(10) Patent No.: US 9,215,409 B2
(45) Date of Patent: Dec. 15, 2015

(54) SYSTEMS AND RELATED METHODS FOR CONTROLLING AUDIO COMMUNICATIONS BETWEEN A RELAY SERVICE AND AN AUDIO ENDPOINT

(71) Applicant: Sorenson Communications, Inc., Salt Lake City, UT (US)

(72) Inventors: Adam Montero, Midvale, UT (US); Daniel Baker, Salt Lake City, UT (US); Lane Walters, American Fork, UT (US); Shane Herndon, Salt Lake City, UT (US); Christine Barton, Herriman, UT (US); Michael R. Ohran, Orem, UT (US); Jeff Thompson, Centerville, UT (US); Michael Bowers, Salt Lake City, UT (US); Ryan Kunz, Salt Lake City, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 53 days.

(21) Appl. No.: 14/253,413

(22) Filed: Apr. 15, 2014

(65) Prior Publication Data

US 2014/0267579 A1  Sep. 18, 2014

Related U.S. Application Data

(63) Continuation-in-part of application No. 13/838,718, filed on Mar. 15, 2013, now Pat. No. 8,989,355.

(51) Int. Cl.
*H04M 11/00* (2006.01)
*H04N 7/14* (2006.01)
(Continued)

(52) U.S. Cl.
CPC ............ *H04N 7/147* (2013.01); *H04L 12/1827* (2013.01); *H04M 3/42391* (2013.01)

(58) Field of Classification Search
None
See application file for complete search history.

(56) References Cited

U.S. PATENT DOCUMENTS

| 6,665,375 B1 * | 12/2003 | Forlenza ................. H04L 12/66 379/52 |
| 7,170,977 B2 | 1/2007 | Doherty et al. |
| 7,295,663 B2 | 11/2007 | McLaughlin et al. |

(Continued)

OTHER PUBLICATIONS

Simmons et al.; U.S. Appl. No. 13/016,243, filed Jan. 28, 2011.
(Continued)

*Primary Examiner* — Maria El-Zoobi
(74) *Attorney, Agent, or Firm* — TraskBritt

(57) ABSTRACT

Communication systems and methods for controlling audio communications between a relay service and an audio endpoint with a video endpoint are disclosed. A communication system comprises a relay service configured to engage in video communications with a video endpoint and audio communications with an audio endpoint. The relay service comprises a control circuit configured to receive call control signals from the video endpoint, and automatically control communications between the relay service and the audio endpoint responsive to the call control signals. A communication system includes a video endpoint comprising a user interface configured to transmit call commands to the relay service responsive to user inputs. The call commands are directed to automatically triggering controls at the relay service over audio communications between the relay service and the audio endpoint. A method includes entering video communication with and receiving call commands from a video endpoint, and automatically executing the call commands.

27 Claims, 10 Drawing Sheets

(51) Int. Cl.
*H04M 3/42* (2006.01)
*H04L 12/18* (2006.01)

(56) References Cited

U.S. PATENT DOCUMENTS

| | | |
|---|---|---|
| 7,746,984 B2 | 6/2010 | Nola et al. |
| 7,769,141 B2 | 8/2010 | Cupal et al. |
| 8,325,883 B2 | 12/2012 | Schultz et al. |
| 8,478,316 B2 | 7/2013 | Gould et al. |
| 8,553,849 B2 | 10/2013 | Michaelis et al. |
| 2002/0098834 A1 | 7/2002 | Yuen |
| 2006/0133583 A1* | 6/2006 | Brooksby ............ H04M 1/2745 379/52 |
| 2007/0036282 A1* | 2/2007 | Engelke ............ H04M 3/42391 379/52 |
| 2007/0064090 A1* | 3/2007 | Park ....................... H04N 7/147 348/14.01 |
| 2007/0064894 A1* | 3/2007 | Armstrong ........ H04M 3/42391 379/142.07 |
| 2008/0031161 A1 | 2/2008 | Osthus et al. |
| 2008/0187108 A1* | 8/2008 | Engelke ................. G10L 15/265 379/52 |
| 2008/0267361 A1* | 10/2008 | Dileo ................... H04M 11/085 379/52 |
| 2009/0028300 A1* | 1/2009 | McLaughlin ..... H04M 3/42391 379/52 |
| 2009/0174759 A1 | 7/2009 | Yeh et al. |
| 2009/0323911 A1 | 12/2009 | Dury |
| 2010/0323728 A1* | 12/2010 | Gould ......... H04M 3/42391 455/466 |
| 2014/0282888 A1* | 9/2014 | Brooksby ......... H04M 3/42391 726/4 |

OTHER PUBLICATIONS

Maxwell et al.; U.S. Appl. No. 14/092,600, filed Nov. 27, 2013.

* cited by examiner

| DATABASE TABLE - AUDIBLY-IMPAIRED PARTY CONTACT-SPECIFIC GREETINGS ||||||
|---|---|---|---|---|
| | NAME | PHONE | INCOMING CUSTOM GREETING | OUTGOING CUSTOM GREETING |
| 1 | SIS | 800-555-1212 | HI SIS, HANG ON WHILE I'M CONNECTED. | HI SIS, WHAT'S UP? |
| 2 | DAD | 802-555-1212 | HI DAD, JUST A SECOND... | HI DAD, I NEED MONEY! |
| . | | | | |
| n | JOHN | 801-555-1212 | <BLANK> | |

FIG. 4

| DATABASE TABLE - AUDIBLY-IMPAIRED PARTY DEFAULT GREETINGS ||||
|---|---|---|---|
| | IMPAIRED PARTY | DEFAULT INCOMING CUSTOM GREETING | DEFAULT OUTGOING CUSTOM GREETING |
| 1 | JOHN DOE | HI, YOU'VE REACHED JOHN, HANG ON WHILE I'M CONNECTED. | HI, THIS IS JOHN CALLING |
| 2 | JANE JENS | HELLO THIS IS JANE, PLEASE HOLD WHILE I'M BEING CONNECTED | JANE CALLING, HELLO? |
| . | | | |
| n | JOHN SON | YOU'VE REACHED JOHN'S PHONE, I'M BEING CONNECTED, PLEASE WAIT. | <BLANK> |

FIG. 5

SYSTEMS AND RELATED METHODS FOR CONTROLLING AUDIO COMMUNICATIONS BETWEEN A RELAY SERVICE AND AN AUDIO ENDPOINT

CROSS-REFERENCE TO RELATE APPLICATION

This application is a continuation-in-part of U.S. patent application Ser. No. 13/838,718, entitled "Methods and Apparatuses for Call Management on a Hearing-Impaired Side of Hearing-Impaired Communication Systems," filed Mar. 15, 2013, pending, the disclosure of which is hereby incorporated in its entirety herein by this reference.

TECHNICAL FIELD

Embodiments discussed herein relate generally to video phone communication systems, and more specifically, to methods and apparatuses for providing call management functions to persons less reliant on audible communications.

BACKGROUND

Video relay services (VRS) may be used so an audibly-impaired user (i.e., a hearing-impaired user, a speech impaired user, or a combination thereof) can carry on conversations with an audibly-capable person (i.e., a hearing-capable and speech-capable user). In such systems, the audibly-impaired user will call in to the VRS and get assigned to a translator. The audibly-impaired user may then use sign language to tell the translator the number to be called and the translator will place the call to the audibly-capable user. The translator will then wait for the call to be answered, state who the audibly-impaired user is that is calling, then begin the translation process between the two sides of the conversation (e.g., translating non-audible communications from the audibly-impaired user to audible communications, translating audible communications from the audibly-capable person to non-audible communications, or a combination thereof).

Similarly, when an audibly-capable user makes a call to an audibly-impaired user, the translator must answer the call, usually very impersonally, then attempts to make the connection to the audibly-impaired user so the conversation between the two end parties can commence. Again, the audibly-impaired user has little control over the answering of the call and only gets involved after the translator has conversed with the audibly-capable user.

These interventions by the translator in VRS systems make the calling process much less personal for both end parties and place the power and focus of the call management with the translator such that the audibly-impaired user is always very aware of the interpreter being the central point of any call.

Therefore, there is a need for methods and apparatuses that provide ways to place more of the call management control with the audibly-impaired user.

SUMMARY

Embodiments discussed herein include methods and apparatuses that provide ways to place call management control with the audibly-impaired user.

Embodiments of the present disclosure include a communication system comprising a relay service. The relay service is configured for providing translation services between an audibly-impaired user of a video endpoint and an audibly-capable user of an audio endpoint. The relay service is also configured to engage in video communications with the video endpoint, and audio communications between the relay service and the audio endpoint. The relay service comprises a control circuit configured to receive call control signals from the video endpoint, and automatically control audio communications between the relay service and the audio endpoint responsive to the call control signals from the video endpoint.

Embodiments of the present disclosure include a method of operating a communication system. The method comprises entering, with a relay service, video communications with a video endpoint. The relay service is configured to provide translation services between an audibly-impaired user of the video endpoint and an audibly-capable user of an audio endpoint. The method also comprises receiving, at the relay service, call commands from the video endpoint directed to controlling audio communications between the relay service and the audio endpoint. The method further comprises automatically executing the call commands from the video endpoint.

Embodiments of the present disclosure include a communication system comprising a video endpoint. The video endpoint is configured for video communication with a relay service. The relay service is configured for providing translation services between an audibly-impaired user of the video endpoint and an audibly-capable user of an audio endpoint. The video endpoint comprises a user interface configured to receive user inputs from the audibly-impaired user during video communication between the video endpoint and the relay service. The video endpoint is also configured to transmit call commands to the relay service responsive to the user inputs. The call commands are directed to automatically triggering controls at the relay service over audio communications between the relay service and the audio endpoint.

BRIEF DESCRIPTION OF THE DRAWINGS

FIGS. 4 and 5 are block diagrams illustrating entries in database;

DETAILED DESCRIPTION

Figure 1:
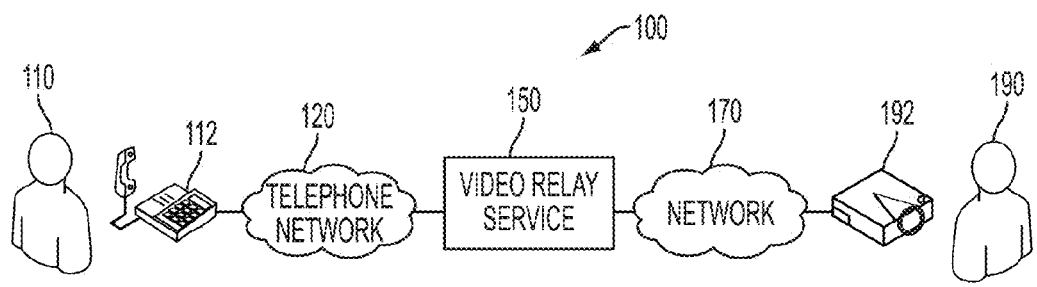
FIG. 1 is a simplified block diagram of a conventional audibly-impaired communication system.

In the following detailed description, reference is made to the accompanying drawings which form a part hereof, and in which is shown by way of illustration specific embodiments in which the invention may be practiced. These embodiments are described in sufficient detail to enable those of ordinary skill in the art to practice the invention. It should be understood, however, that the detailed description and the specific examples, while indicating examples of embodiments of the invention, are given by way of illustration only and not by way of limitation. From this disclosure, various substitutions, modifications, additions, rearrangements, or combinations thereof within the scope of the present invention may be made and will become apparent to those of ordinary skill in the art.

In accordance with common practice, the various features illustrated in the drawings may not be drawn to scale. The illustrations presented herein are not meant to be actual views of any particular method, device, or system, but are merely idealized representations that are employed to describe various embodiments of the present invention. Accordingly, the dimensions of the various features may be arbitrarily expanded or reduced for clarity. In addition, some of the drawings may be simplified for clarity. Thus, the drawings may not depict all of the components of a given apparatus (e.g., device) or method. In addition, like reference numerals may be used to denote like features throughout the specification and figures.

Those of ordinary skill in the art would understand that information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present embodiments may be implemented on any number of data signals including a single data signal.

Those of ordinary skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used herein, the term "audibly-impaired user" refers to a person who is hearing-impaired, speech-impaired, or a combination thereof. A hearing-impaired user may experience hearing impairment ranging from slightly hearing-impaired to completely deaf. Similarly, a speech-impaired user may experience speech impairment ranging from slightly speech-impaired to completely speech-incapable. Also, as used herein, the term "audibly-capable user" refers to a person who is both hearing-capable and speech-capable. Audibly-impaired users may have difficulty communicating with audibly-capable users via conventional voice communication systems (e.g., standard and cellular telephone) because of impairment or absence of an ability to hear, speak, or a combination thereof. A video relay service may enable communication between audibly-impaired users and audibly capable users by translating audible communication to non-audible communication (e.g., speech to sign language), non-audible communication to audible communication (e.g., sign language to speech), or a combination thereof, depending on the audibly-impaired user's type and severity of audible impairment.

Embodiments discussed herein include methods and apparatuses that provide ways to place call management control with the audibly-impaired user. These embodiments help the audibly-impaired caller in a video relay call to have control of managing the call by giving the audibly-impaired caller the hang up and dial controls for the audibly-capable party, and giving the audibly-impaired user a way to seamlessly instruct the translator as to greetings upon call connection. These embodiments also reduce the role of the translator in the call from a call manager to a call facilitator.

Beginning or ending a video relay call can be awkward. When the translator makes their own introduction on the call the audibly-capable person can be confused about who they are on the phone with and may think it is a suspicious call instead of knowing it is their hearing-impaired acquaintance. If a hearing-impaired caller wants to hang up on an audibly-capable person they must ask the translator to do it, which loses the effect. In previous systems, the translator manages the call connection and greeting. The audibly-impaired person sometimes feels like a third party on the call they initiated.

Having the action of the audibly-impaired caller automatically initiate the connection or disconnection of the audibly-capable party they are calling gives the audibly-impaired caller a seamless way to tell the translator what the greeting should be without slowing the call flow. This way, the audibly-impaired caller is in control of managing the call, and the translator is simply facilitating.

Audibly-impaired callers will be able to have a more natural communication pattern with audibly-capable parties; the confusion will be lessened and more productive communication can happen. Fewer audibly-capable people will hang up because they are confused about the nature of the call.

FIG. 1 illustrates a conventional communication system 100 useful for the audibly-impaired. The communication system 100 enables an audibly-impaired user 190 (may also be referred to herein as an audibly-impaired party 390 or impaired party 390) to engage in conversation through the communication system 100 with an audibly-capable user 110. The audibly-impaired user 190 may exhibit varying levels of impairment and may be a voice-capable hearing-impaired user or a voice-incapable hearing-impaired user. Also, the audibly-impaired user 190 may be a hearing-capable voice-incapable user. A communication session between the users is facilitated through the use of various equipments, which are preferably coupled together using one or more networks (120, 170), which may include a telephone network such as the Public Switched Telephone Network (PSTN). Alternatively, use of the term "telephone network" as used herein also contemplates other networks that are compatible and configured to provide communications using digital standards and data packets, an example of which includes Voice Over Internet Protocol (VOIP).

To interface an audibly-impaired user into a generally voice-based communication system, interpretive services are employed allowing audibly-impaired users to communicate with a translator, such as, for example, through sign language. One means for relaying the communicative expressions of an audibly-impaired user 190 within the communication system 100 incorporates a video phone 192 for capturing and displaying the communicative expressions exhibited by the audibly-impaired user 190 and for displaying interpreted voice information originating from the audibly-capable user 110. The expressions, such as sign language and/or body language, may be interpreted or translated by a Video Relay Service (VRS) 150. The audibly-capable user 110 interacts in a conventional manner with the VRS 150 through a voice-based dialogue conveyed over a conventional voice phone 112 and occurring between the audibly-impaired user 190 and a translator at the VRS 150.

Figure 2:
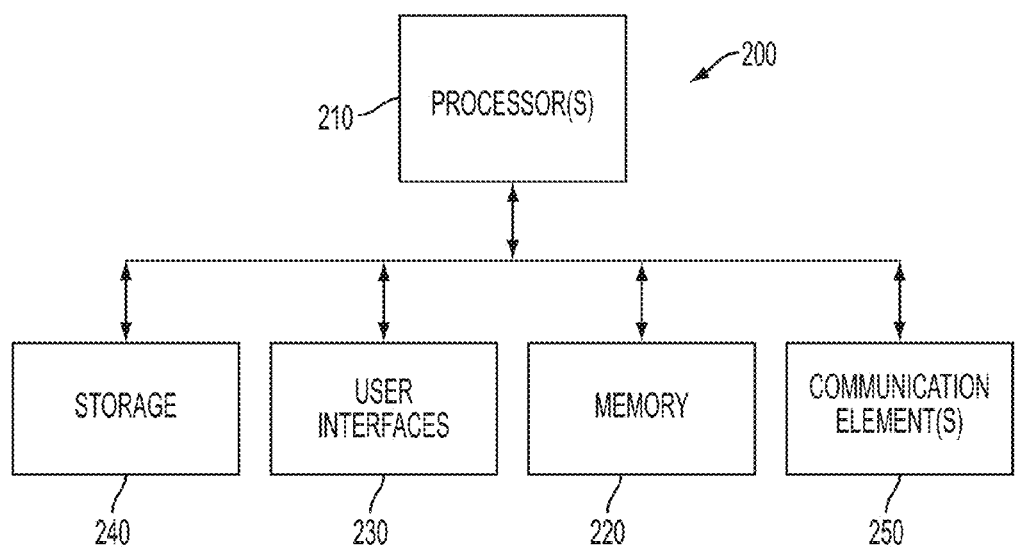
FIG. 2 is a simplified block diagram of processing hardware that may be used in accordance with one or more embodiments of the invention.

FIG. 2 illustrates a computing system 200 for practicing embodiments of the present disclosure. Computer, computing system, and server may be used interchangeably herein to indicate a system for practicing some embodiments of the present disclosure. The computing system 200 is configured for executing software programs containing computing instructions and may include one or more processors 210, memory 220, one or more communication elements 250, user interface elements 230, and storage 240.

As non-limiting examples, the computing system 200 may be a user-type computer, a file server, a compute server, a notebook computer, a tablet, a handheld device, a mobile device, or other similar computer system for executing software.

The one or more processors 210 may be configured for executing a wide variety of operating systems and applications including the computing instructions for carrying out embodiments of the present disclosure.

The memory 220 may be used to hold computing instructions, data, and other information for performing a wide variety of tasks including performing embodiments of the present disclosure. By way of example, and not limitation, the memory 220 may include Synchronous Random Access Memory (SRAM), Dynamic RAM (DRAM), Read-Only Memory (ROM), Flash memory, and the like.

Information related to the computing system 200 may be presented to, and received from, a user with one or more user interface elements. As non-limiting examples, the user interface elements may include elements such as displays, keyboards, mice, joysticks, haptic devices, microphones, speakers, cameras, and touchscreens. A display on the computing system may be configured to present a graphical user interface (GUI) with information about some embodiments of the present disclosure, as is explained below.

The communication elements 250 may be configured for communicating with other devices or communication networks. As non-limiting examples, the communication elements 250 may include elements for communicating on wired and wireless communication media, such as for example, serial ports, parallel ports, Ethernet connections, universal serial bus (USB) connections, IEEE 1394 ("firewire") connections, Bluetooth wireless connections, 802.1 a/b/g/n type wireless connections, and other suitable communication interfaces and protocols.

The storage 240 may be used for storing relatively large amounts of non-volatile information for use in the computing system 200 and may be configured as one or more storage devices. By way of example, and not limitation, these storage devices may include computer-readable media (CRM). This CRM may include, but is not limited to, magnetic and optical storage devices such as disk drives, magnetic tapes, CDs (compact disks), DVDs (digital versatile discs or digital video discs), and other equivalent storage devices.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in flow charts. Furthermore, the processes may be implemented in any suitable hardware, software, firmware, or combinations thereof.

When executed as firmware or software, the instructions for performing the processes may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

By way of non-limiting example, computing instructions for performing the processes may be stored on the storage 240, transferred to the memory 220 for execution, and executed by the processors 210. The processors 210, when executing computing instructions configured for performing the processes, constitute structure for performing the processes and can be considered a special-purpose computer when so configured. In addition, some or all portions of the processes may be performed by hardware specifically configured for carrying out the processes.

The computing system 200 may be used for the video phones, servers, and computers, computing devices, processing devices, and communication devices described herein with varying levels of optional components.

Generally, when discussing calls, they are referred to from the audibly-impaired user's perspective. Thus, an "incoming call" is from an audibly-capable user to an audibly-impaired user and an "outgoing call" is from an audibly-impaired user to an audibly-capable user.

Figure 3A:
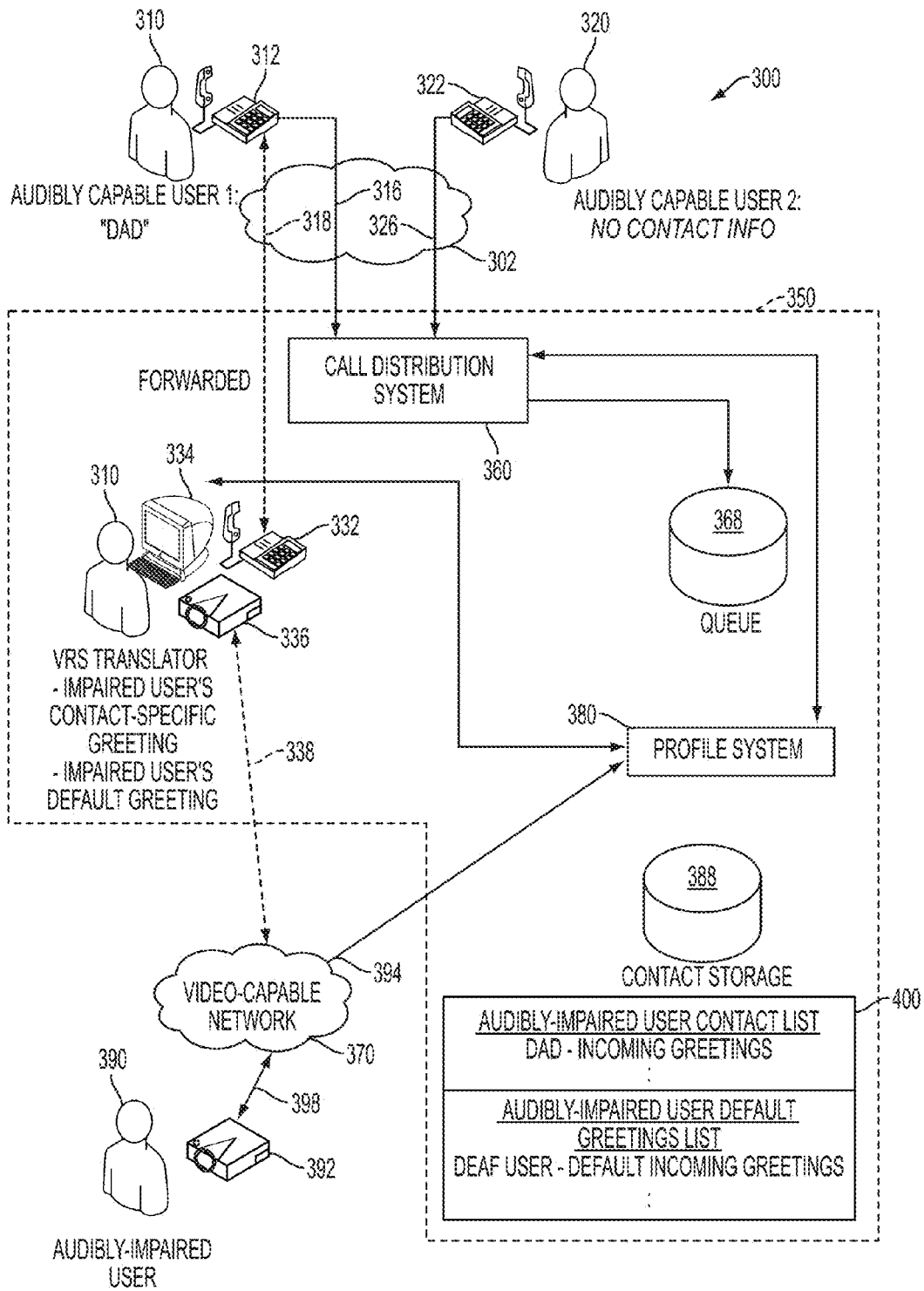
FIG. 3A illustrates a simplified block diagram illustrating a VRS configured for operation with an audibly-impaired communication system and showing a calling process to an audibly-impaired user.

FIG. 3A illustrates a simplified block diagram illustrating a VRS configured for operation with an audibly-impaired communication system and showing a calling process to an audibly-impaired user. The communication system 300 includes one or more audibly-impaired communication systems 392 (one system shown in FIG. 3 for clarity), one or more voice-capable communication systems (312 and 322) and a VRS 350 (also referred to herein as a relay service 350).

The audibly-capable user 310, 320 may use voice-capable equipment 312, 322 to communicate with the VRS 350 through voice-capable connections 316, 326 to a voice-capable network 302. The audibly-impaired user 390 may use the video-capable equipment 392 (also referred to herein as a video phone 392) to communicate with the VRS 350 through a video-capable network 370.

As used herein, voice-capable networks 302 and voice-capable equipment 312, 322 means networks and equipment that can process, convey, reproduce, or a combination thereof, sounds in the auditory frequencies as analog signals, digital signals or a combination thereof. As non-limiting examples, such equipment includes conventional telephones, conventional cellular telephones, and conventional computers or handheld devices with microphone and speaker type capabilities. As non-limiting examples, such networks include a telephone network such as the Public Switched Telephone Network (PSTN) and other networks that are compatible and configured to provide communications using digital standards and data packets, an example of which includes Voice Over Internet Protocol (VOIP).

As used herein, video-capable networks 370 and video-capable equipment 392 means networks and equipment that can process, convey, reproduce, or a combination thereof, multi-frame images. As non-limiting examples, such equipment includes conventional cellular telephones with video capability, and conventional computers or handheld devices with camera and display type capabilities. As non-limiting examples, such networks include cellular networks, WiFi networks, wide area networks, hard wired networks and other private data networks configured to provide communications using digital standards and data packets. To facilitate the enhanced bandwidth needs of video phones 392, the video-capable network 370 may be implemented as a high bandwidth network such as a DSL, Cable, Ethernet or other enhanced-bandwidth networking technology.

Wireless networks may include any network using wireless electromagnetic signals, such as, for example, Wi-Fi, cellular phone networks, Bluetooth, Zigbee, and near-field communication, that is capable of carrying information including at least audio signals and in some embodiments video signals.

In general, most video-capable networks 370 would be considered to also be voice-capable networks 302 and most video-capable equipment 392 would also be considered to be voice-capable equipment 312, 322.

Within the VRS 350, a call distribution system 360 answers calls from audibly-capable users 310, 320 through calling connections 316, 326 and routes them to translators 330 (only one shown in FIG. 3 for clarity) or places them in a queue 368. The incoming calls include a calling connection indicator such as, for example, a telephone number, an Internet Protocol (IP) address, a website address or other unique indicator that indicates how the connection is made and from where the connection is made.

The call distribution system 360 may also query a profile system 380 to determine information about the audibly-capable user 310, 320 placing the call in response to the calling connection indicator, as is explained more fully below in the descriptions of FIGS. 4 and 5. The profile system 380 may access a database 400 in contact storage 388 to obtain the information about the user placing the call, such as, for example one or more greeting identified with the audibly-capable user 310, 320 placing the call, the audibly-impaired user 390 receiving the call, or a combination thereof. The greeting information may be returned to the call distribution system 360. For the case of FIG. 3A, the database would be queried for incoming call greetings, meaning greetings to use with the audibly-capable user 310, 320 when the audibly-impaired user 390 is being called.

As non-limiting examples, if the audibly-capable user 310, 320 is in the audibly-impaired user's contact list, the database may include a custom greeting tailored to that specific contact. Otherwise, the audibly-impaired user 390 may have a default greeting to use in the case where the call comes from someone not in the contact list.

The call distribution system 360 may then assign the incoming call to a translator 330 to handle the call. If a translator is not available, the incoming call may be placed in a queue 368 for subsequent acceptance by a suitable translator 330. The queue 368 may include any greetings correlated with the specific incoming call.

Each translator 330, for the VRS 350 has voice-capable equipment 332 for communication with the audibly-capable user 310, 320, and video-capable equipment 336 for communication with the audibly-impaired user 390 in a suitable gesture language. A computer 334 or other processing hardware may be used in conjunction with, or instead of stand-alone voice-capable equipment 332 and video-capable equipment 336. For example, the translator 330 may use a computer 334 coupled to a camera, a microphone, and speakers or headphones for all the communications.

When a translator 330 is free, a new incoming call from the queue 368 is forwarded 318 to the translator 330. The translator 330 then answers the call with the greeting provided from the profile system 380.

The translator 330 connects to the audibly-impaired user 390 with a video-capable connection 338 through the video-capable network 370, a video-capable connection 398 at the audibly-impaired user's side, and video-capable equipment 392 at the audibly-impaired user's side. Additional details of how this automated connection process for managing custom greeting are provided below in the discussion of FIGS. 4-7.

The database 400 maintained at the VRS 350 may be created, modified and updated by the audibly-impaired user 390 through a network connection 394 to the profile system 380 in the VRS 350. This network connection 394 may be any suitable network, such as for example the internet, and if different from the internet, the voice-capable network 302 or the video-capable network 370. The network connection 394 may also include tools such as web pages for viewing, updating and managing a phone book (i.e., database 400) by and for the audibly-impaired user 390. This phone book may include tools for managing greetings as explained more fully below with reference to FIGS. 5 and 6.

Figure 3B:
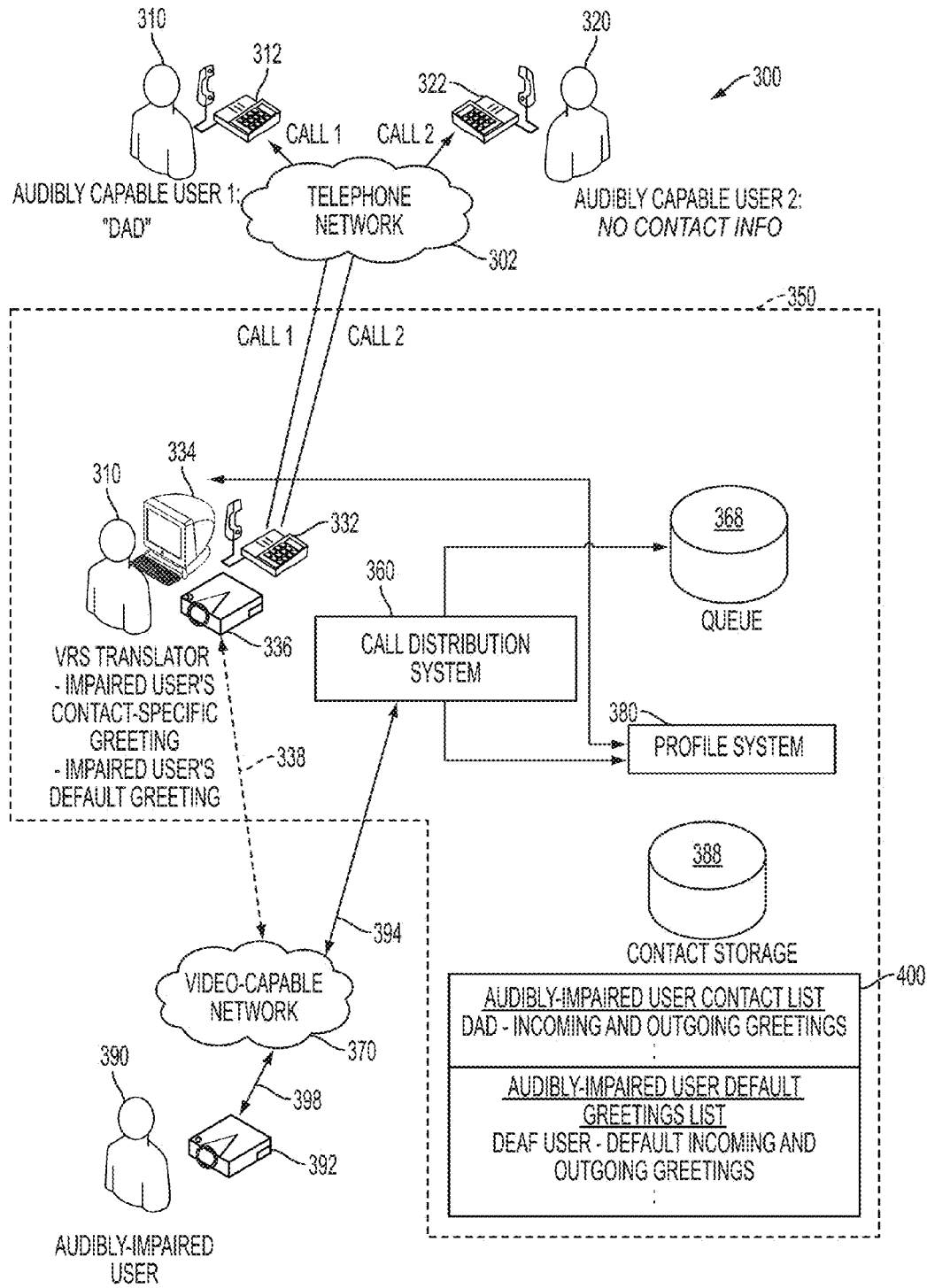
FIG. 3B illustrates a simplified block diagram illustrating a VRS configured for operation with an audibly-impaired communication system and showing a calling process from an audibly-impaired user.

FIG. 3B illustrates a simplified block diagram illustrating a VRS configured for operation with an audibly-impaired communication system and showing a calling process from an audibly-impaired user.

Within the VRS 350, the call distribution system 360 answers calls from the audibly-impaired user 390 through calling connection 394 and routes them to the call distribution system 360.

The outgoing calls include a calling connection indicator such as, for example, a telephone number, an Internet Protocol (IP) address, a website address or other unique indicator that indicates how the connection is made and from where the connection is made. The outgoing call also includes a similar indicator for the audibly-capable user that is being called.

The call distribution system 360 may query a profile system 380 to determine information about the audibly-capable user 310, 320 receiving the call in response to the calling connection indicator, as is explained more fully below in the descriptions of FIGS. 4 and 5. The profile system 380 may access a database 400 in contact storage 388 to obtain the information about the user receiving the call, such as, for example one or more greetings identified with the audibly-capable user 310, 320 receiving the call, the audibly-impaired user 390 placing the call, or a combination thereof. The greeting information may be returned to the call distribution system 360. For the case of FIG. 3B, the database would be queried for outgoing call greetings, meaning greetings to use with the audibly-capable user 310, 320 when the audibly-impaired user 390 is making the call.

As non-limiting examples, if the audibly-capable user 310, 320 is in the deaf user's contact list, the database may include a custom greeting tailored to that specific contact. Otherwise, the audibly-impaired user 390 may have a default greeting to use in the case where the call comes from someone not in the contact list.

The call distribution system 360 may then assign the incoming call to a translator 330 to handle the call. If a translator is not available, the incoming call may be placed on a queue 368 for subsequent acceptance by a suitable translator 330. The queue 368 may include any greetings correlated with the specific outgoing call.

Each translator 330, for the VRS 350 has voice-capable equipment 332 for communication with the audibly-capable user 310, 320, and video-capable equipment 336 for communication with the audibly-impaired user 390 in a suitable gesture language. A computer 334 or other processing hardware may be used in conjunction with, or instead of stand-alone voice-capable equipment 332 and video-capable equipment 336. For example, the translator 330 may use a computer 334 coupled to a camera, a microphone, and speakers or headphones for all the communications.

When a translator 330 is free, a new outgoing call from the queue 368 is forwarded 318 to the translator 330. The translator 330 then uses the greeting provided from the profile system 380 when the audibly-capable user answers the call.

At some time during this process, the translator 330 also connects to the audibly-impaired user 390 with a video-capable connection 338 through the video-capable network 370, a video-capable connection 398 at the audibly-impaired user's side, and video-capable equipment 392 at the audibly-impaired user's side. Additional details of how this automated connection process for managing custom greeting are provided below in the discussion of FIGS. 4-7.

FIGS. 4 and 5 are block diagrams illustrating entries in database 400. In the table of FIG. 4, the database 400 may be thought of as a contact list or phone book for the audibly-impaired user 390 that identifies preferred greetings for the listed contacts. As a result, each audibly-impaired user 390 would have a separate table.

As explained below, the video phone 392 may include a keypad, keyboard, or mouse, or other data entry device configured to enable the audibly-impaired user 390 to initiate a communication session in a conventional manner by entering the telephone number of an audibly-capable user 310, 320. In addition, the audibly-impaired user 390 may be able to interact with database 400 using data entry devices to make changes to the database 400 through the network connection 394.

The database includes entries 410 for contacts 420 of the audibly-impaired user 390. Each entry 410 may include a name for the contact 420, one or more connection indicators 430 for the contact 420, incoming custom greetings 440 and outgoing custom greetings 450. Of course, other fields (not shown) useful in a phone book type database 400 may also be included. When a contact 420 makes a call that is received by the VRS 350, a calling connection indicator indicates the source of the call from the contact 420 (e.g., the cell phone number for Dad). The profile system may be used to correlate the calling connection indicator to an identified entry 410 (indicated by the dashed line to the entry for Dad) based on the connection indicators 430 associated with the identified entry 410.

As non-limiting examples, the connection indicators 430 may include web-site addresses associated with the contact 420, Internet Protocol (IP) addresses associated with the contact 420, wireless phone numbers associated with the contact 420 and wire-line phone number associated with the contact 420. A connection indicator 430 uniquely identifies a contact 420 within the database as well as a means of voice-capable connection 316, 326 (FIG. 3) to the VRS 350, the audibly-impaired user 390, and combinations thereof. For example, suppose the audibly-impaired user who the contact list table of FIG. 4 is associated with makes an outgoing call to "Dad." The database would then return that custom outgoing greeting of "Hi Dad, I need money!"

In the table of FIG. 5, the database 400 may be thought of as a listing of audibly-impaired users 390 that use the VRS service. The database includes entries 460 for audibly-impaired users 390. Each entry 460 may include a name 470 for the audibly-impaired users 390. Alternatively, the entry 470 may be associated with one or more connection indicators 430 for the audibly-impaired users 390. A default incoming custom greetings 480 and default outgoing custom greeting 490 may also be included. Of course, other fields (not shown) useful in a phone book type database 400 may also be included. When an audibly-capable user makes or receives a call and that person is not in the audibly-impaired user's contact list 410, the database will select the default greeting that is appropriate for the audibly-impaired user and the nature of the call (i.e., incoming or outgoing). For example, suppose an audibly-capable user makes an incoming call to "John Son" and that audibly-capable user is not in the contact list (i.e., the table of FIG. 4) for John Son. The database would then return the default incoming greeting for John Son, of; "You've reached John's phone. I'm being connected please wait."

Figure 6:
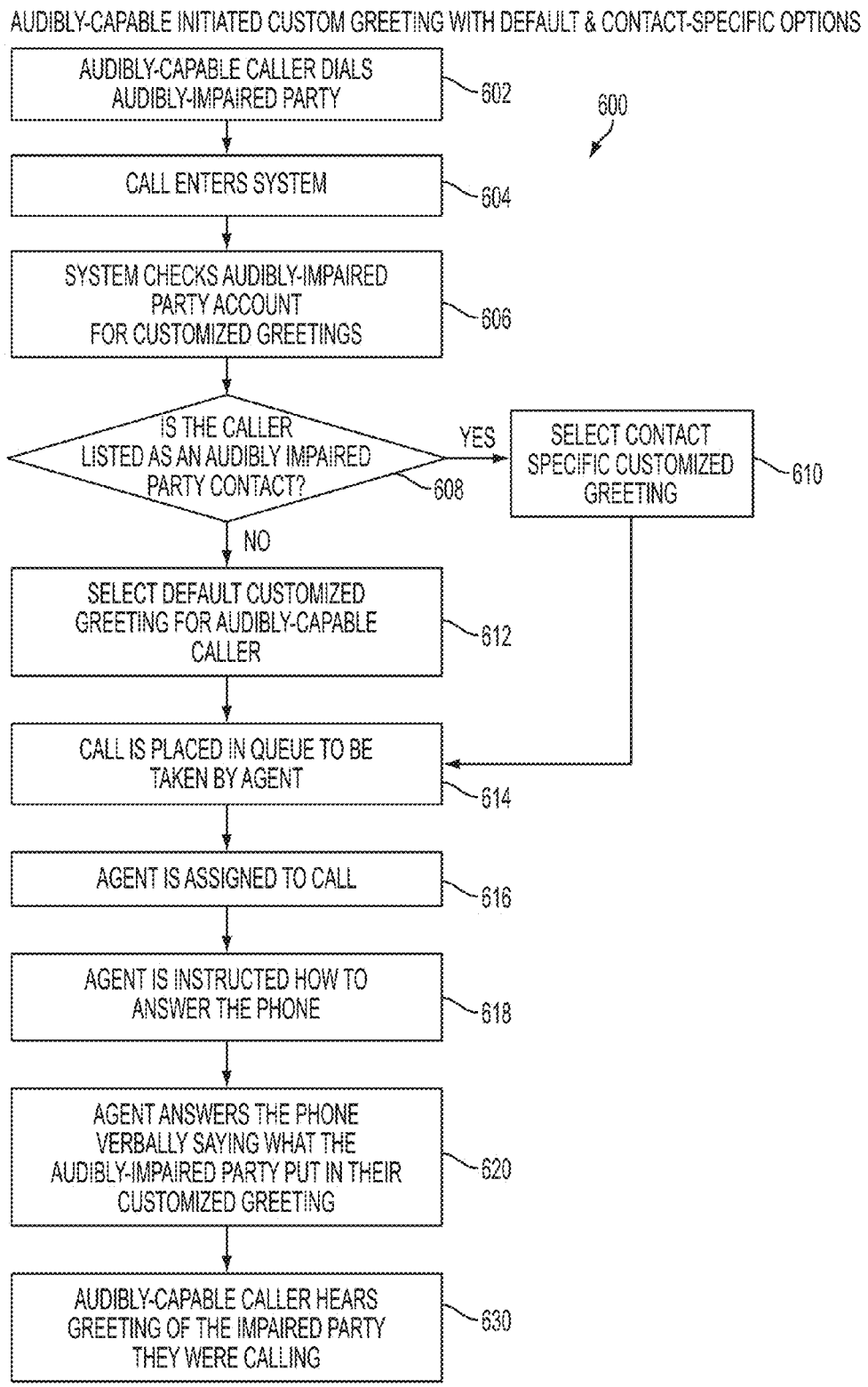
FIG. 6 is a simplified flow diagram illustrating a servicing process for a call placed to an audibly-impaired user.

FIG. 6 is a simplified flow diagram illustrating a servicing process for a call placed to an audibly-impaired user. In describing the processes of FIG. 6 reference may also be made to FIGS. 3A, 4 and 5. An incoming call process 600 may include actions for receiving a call from the audibly-capable user 310, 320. Operation block 602 indicates that an audibly-capable user 310, 320 places a call to an audibly-impaired user 390. This call will have a calling connection indicator associated with it indicating from where the call was placed (e.g., an IP address). Operation block 604 indicates that the call is received by the VRS 350 and enters the call distribution system 360.

Operation block 606 indicates that the system checks for contact information. In other words, the call distribution system 360 may inquire the profile system 380 to see if there is a contact 420 in the database 400 with a connection indicator 430 that matches the calling connection indicator of the person making the call. Decision block 608 indicates this test to see if the calling party is listed as a contact for the audibly-impaired party 390.

If the caller is listed as a contact 420 in the database 400, operation block 610 indicates that the appropriate incoming custom greeting is selected that is associated with the audibly-capable user making the call. If the caller is not listed as a contact 420 in the database 400, operation block 612 indicates that the appropriate incoming default greeting is selected that is associated with the audibly-impaired user receiving the call.

After selecting a greeting, either custom from operation 610 or default from operation 612, the call is placed in the queue to be taken by a translator at operation 614. In some embodiments, if there is translator available immediately placing the call in the queue may be bypassed.

At operation 616 a translator is assigned to the call and at operation 618, the translator is instructed how to greet the audibly-capable user when the translator answers. At operation 620 the translator verbally answers the call with the customized greeting designed by the audibly-impaired user being called. Finally, at operation 630, the audibly-capable user hears the custom greeting.

At some point during this process, the connection to the audibly-impaired user may also be processed so that the two end parties are ready to begin a conversation with the assistance of the translator.

Figure 7:
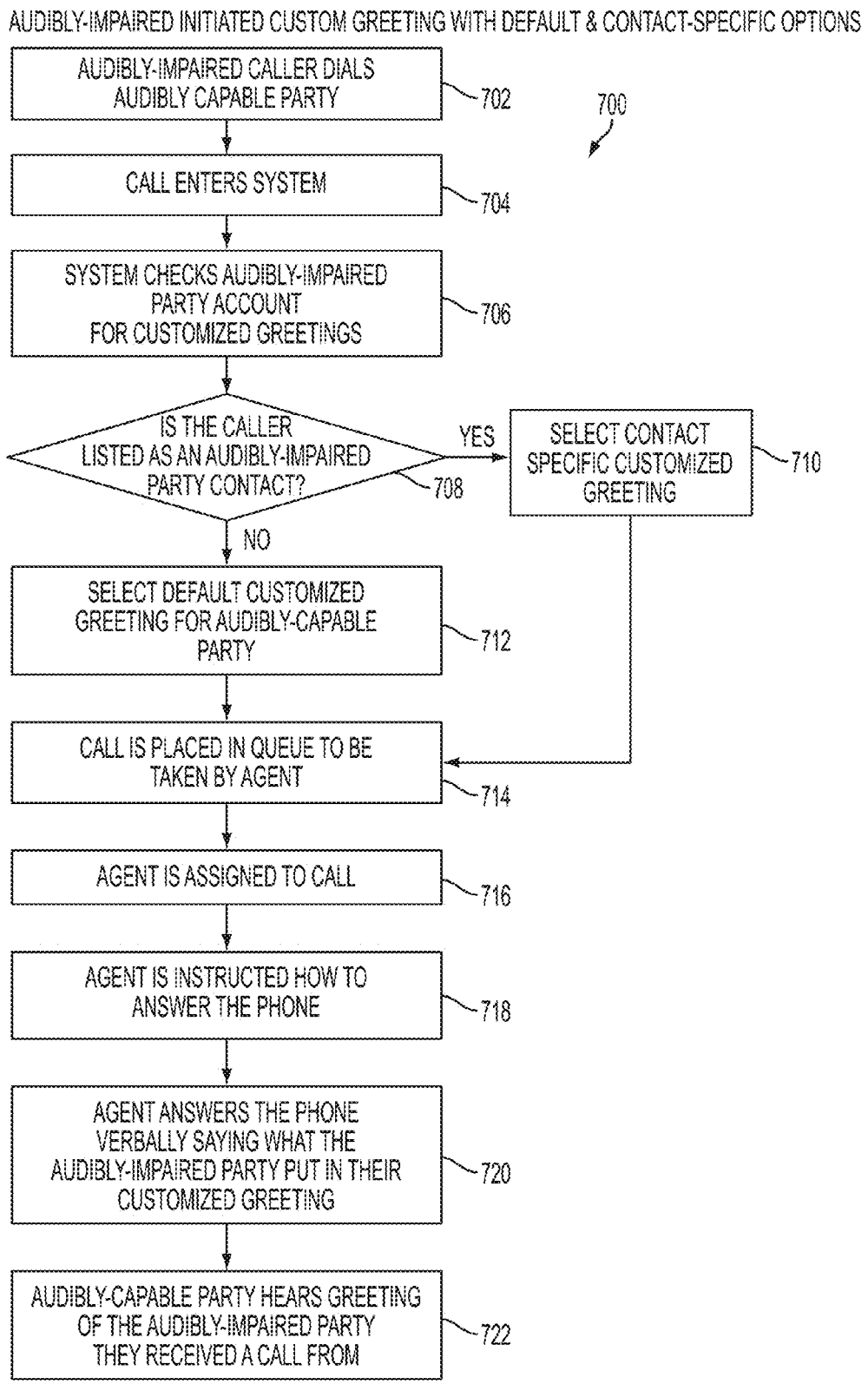
FIG. 7 is a simplified flow diagram illustrating a servicing process for a call placed from an audibly-impaired user.

FIG. 7 is a simplified flow diagram illustrating a servicing process for a call placed from an audibly-impaired user. In describing the processes of FIG. 7 reference may also be made to FIGS. 3B, 4 and 5. An outgoing call process 700 may include actions for sending a call from the audibly-impaired user 390 to an audibly-capable user 310, 320. Operation block 702 indicates that an audibly-impaired user 390 places a call to an audibly-capable user 310, 320. This call may have a calling connection indicator associated with it indicating from where the call was placed (e.g., an IP address). The call will also have a calling connection indicator associated with it indicating to whom the call is being placed (e.g., a telephone number). Operation block 704 indicates that the call is received by the VRS 350 and enters the call distribution system 360.

Operation block 708 indicates that the system checks for contact information. In other words, the call distribution system 360 may inquire the profile system 380 to see if there is a contact 420 in the database 400 with a connection indicator 430 that matches the calling connection indicator of the person being called. Decision block 708 indicates this test to see if the called party is listed as a contact for the hearing-impaired party 390.

If the called party is listed as a contact 420 in the database 400, operation block 710 indicates that the appropriate outgoing custom greeting is selected that is associated with the audibly-capable user receiving the call. If the caller is not listed as a contact 420 in the database 400, operation block 712 indicates that the appropriate outgoing default greeting is selected that is associated with the audibly-impaired user sending the call.

After selecting a greeting, either custom from operation 710 or default from operation 712, the call is placed in the queue to be taken by a translator at operation 714. In some embodiments, if there is translator available immediately placing the call in the queue may be bypassed.

At operation 716 a translator is assigned to the call and at operation 718, the translator is instructed how to greet the audibly-capable user when that party answers. At operation 720 the translator verbally answers the call with the customized greeting designed by the audibly-impaired user placing the call. Finally, at operation 722, the audibly-capable user hears the custom greeting.

Returning to FIG. 3, if the audibly-impaired user 390 is voice-incapable, then communication with the translator 330 occurs primarily through the use of gestures such as a suitable sign language. If the audibly-impaired user 390 is voice-capable, then communication with the translator 330 may be performed by the audibly-impaired user 390 expressing themselves through voice signals and receiving communication from the translator 330 through the use of sign language or text based interfaces.

For voice-incapable audibly-impaired users 390, the sign language images are translated or interpreted by the translator 330 providing a level of relay service defined as the "video relay service." When the sign language images are translated by translator 330 of the relay service 350 they are forwarded as voice information over the voice-capable connection 316, 326 to the audibly-capable user 310, 320. The audibly-capable user 310, 320 interacts in a conventional manner with the translator 330 through the use of voice-based dialog conveyed over the voice-capable connection 316, 326.

For voice-capable audibly-impaired users 390, extensions of relay services have included the development of voice bridges known as Voice Carry-Over (VCO) which enable the voice-capable audibly-impaired user 390 to speak directly to the audibly-capable party. In such an application, the VRS 350 may form the voice bridge or conferencing of the voice-capable audibly-impaired user's voice. In such a service configuration, once the conference call is established, the translator 330 is employed only for the conversion of the voice portion of the call from the audibly-capable user 310, 320 that is to be delivered to the hearing-impaired user 390. It should be apparent that not all audibly-impaired individuals have adequate or intelligible speech capabilities for utilization of a relay service configured to provide VCO services. However, such an arrangement does provide a more efficient and personal method of communication between a voice-capable audibly-impaired user and another individual.

Figure 8:
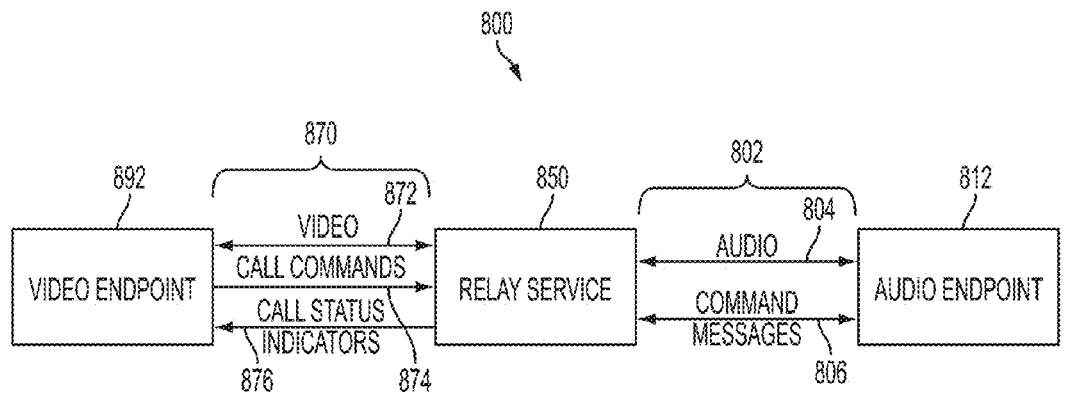
FIG. 8 is a simplified block diagram of a communication system for audibly-impaired users according to an embodiment of the present disclosure.

FIG. 8 is a simplified block diagram of a communication system 800 for audibly-impaired users according to an embodiment of the present disclosure. The communication system 800 may include a relay service 850 configured to provide translation services to an audibly-impaired user of a video endpoint 892. The relay service 850 may be configured to communicate with the video endpoint 892 through a video-capable network 870. The relay service 850 may also be configured to communicate with an audio endpoint 812 through a voice-capable network 802. The video endpoint, the video-capable network 870, the relay service 850, the voice-capable network 802, and the audio endpoint may be similar to the video-capable equipment 392, the video-capable network 370, the relay service 350, the voice-capable network 302, and the voice-capable equipment 312, 322 of FIGS. 3A and 3B.

The video endpoint 892 may be configured to at least partially control the audio communications between the relay service 850 and the audio endpoint 812. For example, the video endpoint 892 may be configured to cause the relay service 850 to send a request to participate in a communication session to the audio endpoint 812. Also, the video endpoint 892 may be configured to cause the relay service 850 to terminate audio communication sessions between the relay service 850 and the audio endpoint 812. As a result, the audibly-impaired user of the video endpoint 892 may have control over the audio communications between the relay service 850 and the audio endpoint 812, similar to the control audibly-capable users typically have during conventional audio communications with each other (e.g., during conventional telephone calls).

The relay service 850 and the audio endpoint 812 may be configured for audio communication with each other via audio 804. The audio 804 may comprise data corresponding to acoustic energy converted to audio signals at the relay service 850, the audio endpoint 812, or a combination thereof. For example, the audio 804 may comprise data corresponding to speech of a translator at the relay service 850, and speech of an audibly-capable user at the audio endpoint 812. Accordingly, the translator and the audibly-capable user may engage in verbal conversation via the audio 804. The audio 804 may be transmitted between the relay service 850 and the audio endpoint 812 through the voice-capable network 802.

The relay service 850 and the audio endpoint 812 may be configured to send and receive command messages 806 to each other through the voice-capable network 802. The command messages 806 may comprise messages conforming to a communication protocol facilitating the communication between the relay service 850 and the audio endpoint 812. By way of non-limiting example, communication between the relay service 850 and the audio endpoint 812 may comprise standard telephone communications. Accordingly, an Integrated Services Digital Network (ISDN) User Part (ISUP) protocol may be used. Corresponding command messages 806 may include Initial Address Messages (IAMs), Address Complete Messages (ACMs), Answer Messages (ANMs), Release messages (REL), and others. Also by way of non-limiting example, a Session Initiation Protocol (SIP) may be used. Corresponding command messages 806 may include INVITE (for initiating a session), ACK (confirmation of receipt of a message), BYE (for terminating a session), and others. The relay service 850 may also be configured to communicate with the audio endpoint 812 using a variety of other protocols known in the art.

The relay service 805 and the video endpoint 892 may be configured for video communication via video 872. The video 872 may comprise data corresponding to video images captured at the relay service 850, the video endpoint 892, or a combination thereof. The video 872 may be transmitted between the relay service 850 and the video endpoint 892 through the video-capable network 870, which may be similar to the video-capable network 370 discussed above with respect to FIGS. 3A and 3B. Thus, the audibly-impaired user of the video endpoint 892 and the translator at the relay service 850 may be enabled to communicate via non-verbal communications (e.g., American Sign Language).

As previously discussed, the audibly-impaired user of the video endpoint 892 may experience any of a variety of different levels and types of audible impairment. Accordingly, in some embodiments the video 872 may also include data corresponding to acoustic energy converted to audio signals at the relay service 850, the video endpoint 892, or a combination thereof. In addition, the video 872 may include portions of the audio 804 that originate at the audio endpoint 812 and that are relayed to the video endpoint 892 by the relay service 850. Furthermore, the relay service 850 may relay audio signals from the video 872 that originate at the video endpoint 892 to the audio endpoint 812 via the audio 804. Accordingly, the audibly-impaired user may engage in voice communication with the audibly-capable user of the audio endpoint 812 to the extent the audibly-impaired user is capable.

The relay service 850 may also be configured to transmit call status indicators 876 to the video endpoint 892 during audio communication between the relay service 850 and the audio endpoint 812. The call status indicators 876 may indicate a status of the audio communication. By way of non-limiting example, the call status indicators 876 may comprise a "ringing" indicator, indicating that an invitation to engage in audio communication was sent to the audio endpoint 812, but the invitation has not yet been accepted. Also by way of non-limiting example, the call status indicators 876 may comprise a "connected" status indicator, indicating that the translator at the relay service 850 is participating in audio communications with the audibly-capable user of the audio endpoint 812 on behalf of the audibly-impaired user. As a further example, the call status indicators 876 may comprise a "disconnected" indicator, indicating that one of the audibly-impaired user, the translator, and the audibly-capable user terminated the audio communication between the relay service 850 and the audio endpoint 812. In addition, a "busy," call status indicator may be included, indicating that an invitation to engage in audio communication was sent to the audio endpoint 812, but that the audio endpoint 812 is already participating in another audio communication session. Furthermore, the call status indicators 876 may comprise indicators that indicate when the translator is speaking, the audibly capable user is speaking, or a combination thereof. Other call status indicators, and their equivalents, are contemplated within the scope of the present disclosure.

In some embodiments, the relay service 850 may be configured to determine the call status by analyzing the command messages 806. By way of non-limiting example, if an ISUP protocol is used, the relay service 850 may determine that the current status is "ringing" if the relay service sent an IAM message via the command messages 806 to the audio endpoint 812, and a reply has not been received. In some embodiments, the relay service 850 may be configured to determine the call status by analyzing the audio 804 (e.g., detecting ring tones, busy signals, dial tones, etc.). In some embodiments, the call status indicators 876 may comprise the command messages 806, the audio 804, or a combination thereof, which may be analyzed by the video endpoint 892 to determine the status of the audio communications between the relay service 850 and the audio endpoint 812. In some embodiments, the relay service may be configured to detect when the audibly-capable user and the translator are speaking, and indicate who is speaking via the call status indicators 876. The video endpoint 892 may be configured to present the status of the audio communications between the relay service 850 and the audio endpoint 812 to the audibly-impaired user (e.g., via a graphical user interface). Thus, the audibly-impaired user may be made aware of the status of the audio communications in real-time or quasi real-time, without the translator conveying the status to the audibly-impaired user.

The relay service 850 may also be configured to receive call commands 874 from the video endpoint 892 through the video-capable network 870. The call commands 874 may be directed to controlling the audio communication between the relay service 850 and the audio endpoint 812. By way of non-limiting example, the call commands 874 may include a hang-up command for terminating the audio communication between the relay service 850 and the audio endpoint 812. Also by way of non-limiting example, the call commands 874 may include a first command for causing the relay service 850 to invite an audio endpoint 812 indicated by the first command to enter a communication session with the relay service 850. Other commands are also contemplated (e.g., a hold command, a hang-up command, etc.).

The relay service 850 may be configured to automatically execute the call commands 870 without intervention from the translator at the relay service 850. If the call commands 874 are received during video communication between the relay service 850 and the video endpoint 892 (i.e., a translator is ready for audio communications with the audibly-capable user), the relay service 850 may execute the call commands 870 substantially immediately. Video communication between the video endpoint 892 and the relay service 850 may be initiated by the video endpoint 892 or the relay service 850. For example, the video endpoint 892 may call the relay service 850, and wait for video communication to be initiated. Also, the relay service 850 may call the video endpoint 892 (e.g., when audio communication is established between the translator and an audibly-capable user of the audio endpoint 812 after the audio endpoint 812 calls the audibly-impaired user of the video endpoint 892). Once video communication is established between the audibly-impaired user of the video endpoint 892 and the translator at the relay service 850, the call commands 874 may be automatically executed by the relay service 850 substantially immediately.

If, however, the call commands 874 are not received during video communication between the relay service 850 and the video endpoint 892, the call commands may enter a queue until video communication is established between the video endpoint 892 and the relay service 850. Further detail regarding how the relay service may handle call commands 874 that are not received during video communication is disclosed in U.S. Pat. No. 7,746,984 to Nola, et al., the disclosure of which is hereby incorporated herein in its entirety by this reference.

During video communication between the video endpoint 892 and the relay service 850, the audibly-impaired user may thus have direct control (dialing, calling, hanging-up, and other functions) over the audio communications between the relay service 850 and the audio endpoint 812. The audibly-impaired user may also be informed in real-time or quasi real-time, of the status of the audio communications (e.g., ringing, connected, disconnected, busy, translator is speaking, audibly-capable user is speaking, etc.). As a result, during video communications between the video endpoint 892 and the relay service 850, the audibly-impaired user may have similar control and knowledge with respect to the audio communications as an audibly-capable person would have in conventional audio communication systems.

Figure 9:
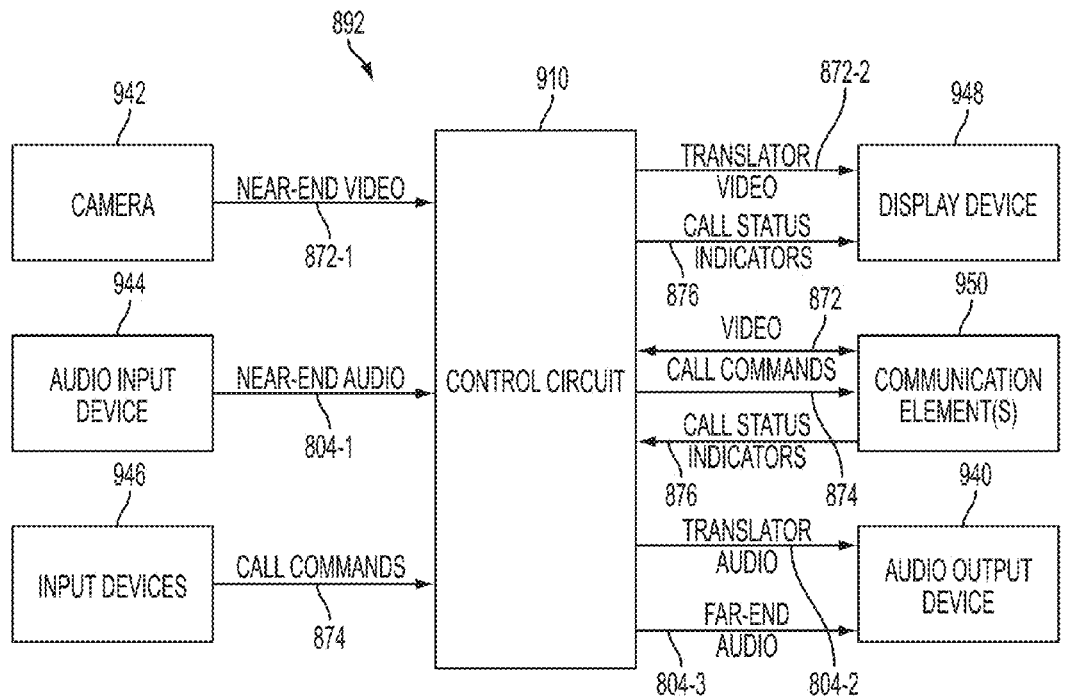
FIG. 9 is a simplified block diagram of the video endpoint of FIG. 8.

FIG. 9 is a simplified block diagram of the video endpoint 892 of FIG. 8. The video endpoint 892 may comprise a computing system 200, as discussed above with respect to FIG. 2. For example, the video endpoint 892 may comprise a control circuit 910 including one or more processors 210, a memory 220, and a storage 240, as discussed above with respect to FIG. 2. Also, the video endpoint 892 may comprise user interface elements 230, including a camera 942, an audio input device 944, one or more input device 946, a display device 948, and an audio output device 940, each operably coupled to the control circuit 910. Furthermore, the video endpoint 892 may comprise one or more communication elements 950 operably coupled to the control circuit 910, similar to the one or more communication elements 250 discussed above with respect to FIG. 2.

In operation, video communication may be established between the video endpoint 892 and the relay service 850 (FIG. 8). For example, the video endpoint 892 may send a request for a video communication session to the relay service 850, and a translator at the relay service 850 may accept the request. Also, the video endpoint 892 may receive a request for a video communication session from the relay service 850, and the audibly-impaired user may accept the request. In addition, a video communication session may already be in progress. For example, an audio communication session between the relay service 850 and the audio endpoint 812 (FIG. 8) on behalf of the audibly-impaired user may be in progress, or terminated without terminating the video communication session between the video endpoint 892 and the relay service 812.

During a video communication session between the video endpoint 892 and the relay service 850, the camera 942 may capture video images of the audibly-impaired user and provide the video images to the control circuit 910 as near-end video 872-1. The camera 942 may include any device capable of capturing video images (e.g., a webcam, a camcorder, etc.). The audio input device 944 may convert acoustic energy (e.g., the audibly-impaired user's speech) at the video endpoint 892 to near-end audio 804-1. The audio input device 944 may include any device capable of converting acoustic energy to electrical signals (e.g., a microphone).

The control circuit 910 may receive the near-end video 872-1 and the near-end audio 878-1. The control circuit 910 may transmit the near-end video 872-1 and the near-end audio 872-1 to the relay service 850 via the video 872 through the communication elements 950. The control circuit 910 may receive translator video 872-2 (i.e., video images from the relay service 850), and translator and far-end audio 878-2, 872-3 (e.g., audio from the relay service 850, the audio endpoint 812, respectively) via the video 872 through the communication elements 950. The control circuit 910 may cause the display device 948 to display the translator video 872-2 for the audibly-impaired user. The display device 948 may include an electronic display (e.g., a liquid crystal display). The control circuit 910 may also cause the audio output device 940 to convert the translator audio 804-2 and the far-end audio 804-3 to acoustic energy to be heard by the audibly-impaired user (if the audibly-impaired user has some hearing capability). The audio output device 940 may include any device capable of converting electrical signals to acoustic energy (e.g., a speaker, a headphone, etc.).

The one or more input devices 946 may include a touch-screen interface (e.g., integrated with the display device 948), a keyboard, a mouse, a button array, a track-pad, etc. The one or more input devices 946 may be configured to enable the audibly-impaired user to control (e.g., initiate, terminate, etc.) audio communication sessions between the relay service 850 and the audio endpoint 812 on behalf of the audibly-impaired user during video communication sessions. The one or more input devices 946 may be configured to receive user inputs. For example, during video communication sessions, the control circuit 910 may be configured to detect call commands 874 from the input devices 946 responsive to user inputs. The control circuit 910 may be configured to present call command options on the display device 948, and the input devices 946 may enable the user to select the call command options. The control circuit 910 may receive the call commands 874 from the input devices 946 and transmit the call commands 874 to the relay service 850. The relay service 850 may automatically execute the call commands 874 during video communications with the video endpoint 892.

The call commands 874 may include a first command indicating an audio endpoint 812 the audibly-impaired user desires to call, and direct the relay service 850 to send a request to the audio endpoint 812 to participate in audio communications. By way of non-limiting example, the input devices 946 may enable the audibly-impaired user to input a calling connection indicator such as, for example, a telephone number, an IP address, a website address, or other unique indicator corresponding to the audio endpoint 812, to generate the first command. Also by way of non-limiting example, the input devices 946 may enable the audibly-impaired user to select the audibly-capable user of the audio endpoint 812 from a list of people in a contacts list to generate the first command. As another non-limiting example, the input devices 946 may enable the audibly-impaired user to select the audibly-capable user from a call history to generate the first command.

In addition, the first command may be generated using a redial function. For example, the control circuit 910 may store the calling connection indicators for one or more of the audio endpoints 812 that the audibly-impaired user most recently directed the relay service 850 to enter audio communications with on behalf of the audibly-impaired user. In some embodiments, the input devices 946 may detect a redial input, and the most recently called audio endpoint 812 may be indicated by the first command responsive to the redial input. In some embodiments, responsive to the redial input, the list of most recently called audio endpoints 812 may be presented to the audibly-impaired user. The audibly-impaired user may select one of the most recently called audio endpoints 812 from the list, and the first command may indicate the selected one of the most recently called audio endpoints.

The call commands 874 may also include a hang-up command directing the relay service 850 to terminate audio communications with the audio endpoint 812. Other commands are also contemplated within the scope of the present disclosure. For example, commands directed to providing control to the audibly-impaired user over call-waiting, putting audio communications on hold, and other functions associated with audio communications may be included by the call commands 874.

The control circuit 910 may receive call status indicators 876 from the relay service 850 through the communication elements 950. As previously discussed, the call status indicators 876 may indicate the status of the audio communications between the relay service 850 and the audio endpoint 812 on behalf of the audibly-impaired user. For example, the call status indicators 876 may indicate that the status of the audio communications is one of ringing, connected, and disconnected. The control circuit 910 may cause the display device 948 to indicate the status indicated by the call status indicators 876. In some embodiments, the display device 948 may comprise a spatial visual indicator comprising one or more illuminatable elements (e.g., a ring of light emitting diodes) configured to display patterns corresponding to the status of the audio communications. Such a spatial visual indicator is disclosed in U.S. Pat. No. 7,769,141 to Cupal et al., titled "Method and system for visual spatial caller identification," and U.S. patent application Ser. No. 14/092,600 to Maxwell et al., titled "Systems and related methods for visual indication of an occurrence of an event," the disclosure of each of which is hereby incorporated herein in its entirety by this reference. In some embodiments, the status may be indicated via a graphical user interface displayed on the display device 948. By way of non-limiting example, the status may be indicated textually (e.g., by displaying one of the words "ringing," "connected," or "disconnected"). Also by way of non-limiting example, the graphical user interface may display a virtual spatial visual indicator (e.g., a ring of virtual illuminatable elements) configured to indicate the status of the audio communications.

In some embodiments, the status of the audio communications may be indicated to the audibly-impaired user tactilely (e.g., with tactile vibrations). For example, different vibration patterns may correspond to different statuses of the audio communications. Accordingly, the control circuit 910 may be configured to drive a vibration element (e.g., a vibration motor) according to the vibration pattern corresponding to the status indicated by the call status indicators 876. Examples of vibration patterns for a tactile caller identification system are disclosed in U.S. patent application Ser. No. 13/016,243 to Simmons et al., titled "Methods and apparatuses for tactile caller identification in hearing-impaired communication systems," the entire disclosure of which is hereby incorporated herein by this reference in its entirety. Similar vibration patterns may be used to indicate the status of the audio communications.

Figure 10:
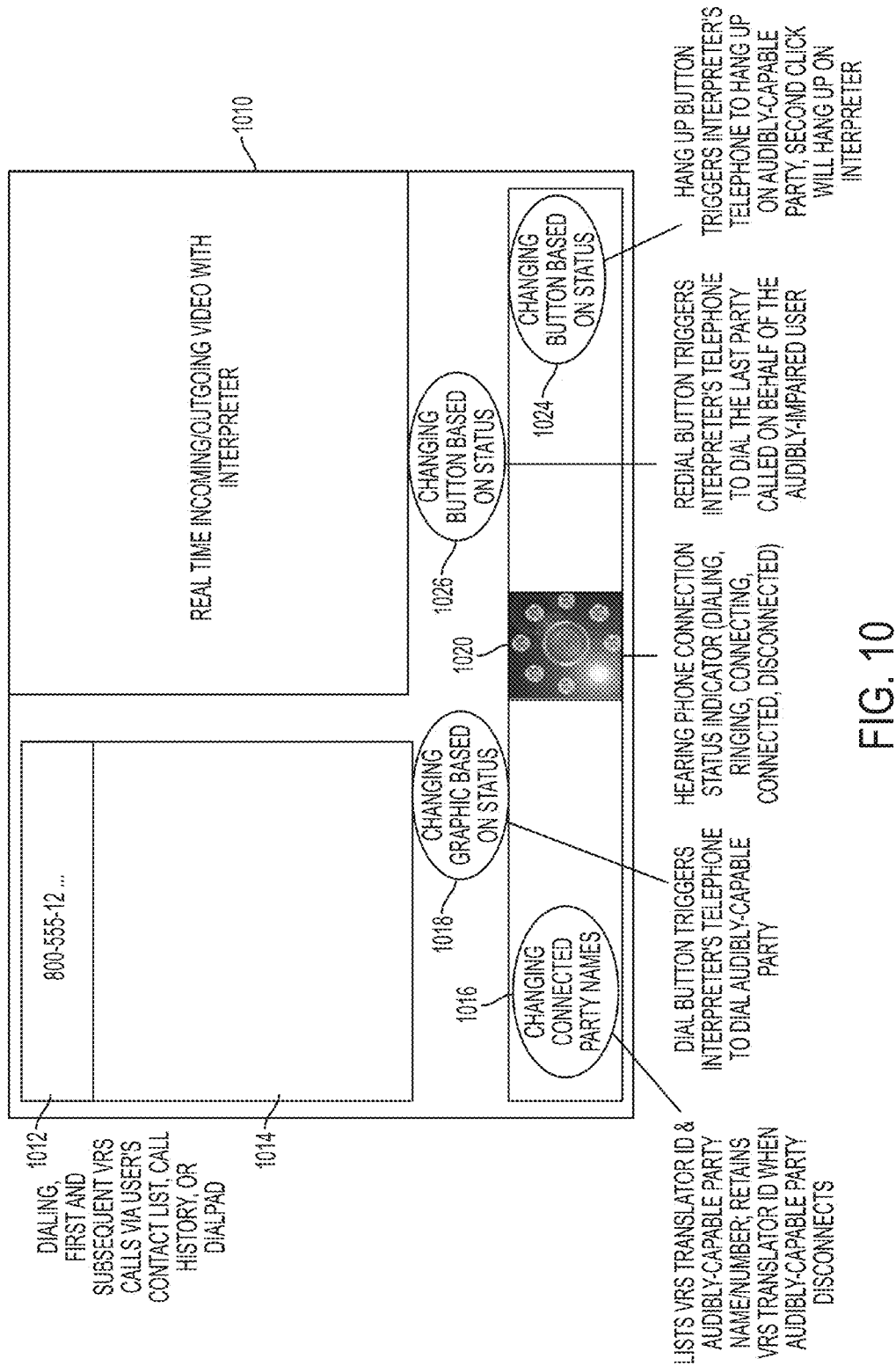
FIG. 10 is a simplified Graphical User Interface (GUI) illustrating some controls and notifications that may be available to the audibly-impaired user.

FIG. 10 is a simplified Graphical User Interface (GUI) illustrating some controls and notifications that may be available to the audibly-impaired user. A video window 1010 may be included to display real time incoming and outgoing video with the interpreter. A calling number indicator 1012 may be present to indicate the current number that is to be called, or that is being called. As non-limiting examples, this number could come from the user entering it on a dialpad, selecting it from a call history, selecting a redial option, or selecting it from a contact list. A list window 1014 may be included to display list elements such as the call history, a list of recently dialed numbers, and the contact list. In some embodiments, the calling number indicator 1012 may be configured for editing by the audibly-impaired user. For example, if a number is dialed and results in a wrong number, the user may then use a redial selector 1026 to place the wrong number in the calling number indicator 1012. The user may then correct mistakes in the wrong number without having to completely re-input the correct number.

A connection display indicator 1016 may be included to show current connections and information related to the current call. As non-limiting examples, this indicator may display a translator ID, an audibly-capable party's name, and an audibly-capable party's number. In some embodiments, the connection to the audibly-capable party may be terminated, but the connection to the translator may be maintained.

A call connection selector 1018 (e.g., a dial button) may be presented to allow the user to cause the computing device to send instructions to the relay service to make a calling connection with an audibly-capable user without intervention from the translator (e.g., via the call commands of FIGS. 8 and 9).

A call disconnect selector 1024 (e.g., a hang up button) may be presented to allow the user to cause the computing device to send instructions to the relay service to disconnect the audibly-capable user without intervention from the translator. In some embodiments, this selection may also cause the translator to be disconnected. In other embodiments, this may maintain the connection with the translator so the user can make another call. In such embodiments selection of the call disconnect selector 1024 a second time may cause the translator to be disconnected.

A redial selector 1026 may be presented to enable the user to send instructions to the relay service to make a calling connection with the last audibly-capable user that the relay service made a calling connection with on behalf of the user. In some embodiments, a predetermined number of selectable indicators corresponding to the predetermined number of the last audibly-capable users that the relay service made a calling connection with on behalf of the user may be displayed responsive to the user selecting the redial selector 1026. The user may select one of the predetermined number of selectable indicators that corresponds to the audibly-capable user that the user desires the relay service to call.

A connection status indicator 1020 may be included to show the present status of the calling connection to the audibly-capable user's phone. As a non-limiting example, there may be a different status indicator to show no connection, a dialing status, a ringing status, and a connected status. For some status indicators (e.g., the dialing status and the ringing status) a LightRing animation may be presented. This animation may show an emulation of a lens and a light group. For example the lights may alternatively light in a circular pattern while the connection is in a ringing status. In addition this status indicator may be configured to emulate other LightRing configuration, such as, for example those disclosed in U.S. Pat. No. 7,769,141 to Cupal et al. As another non-limiting example, the connection status indicator 1020 may present the status of the calling connection to the audibly-capable user's phone via text alerts. Text descriptive of the calling connection status may be displayed by the connection status indicator 1020.

Figure 11:
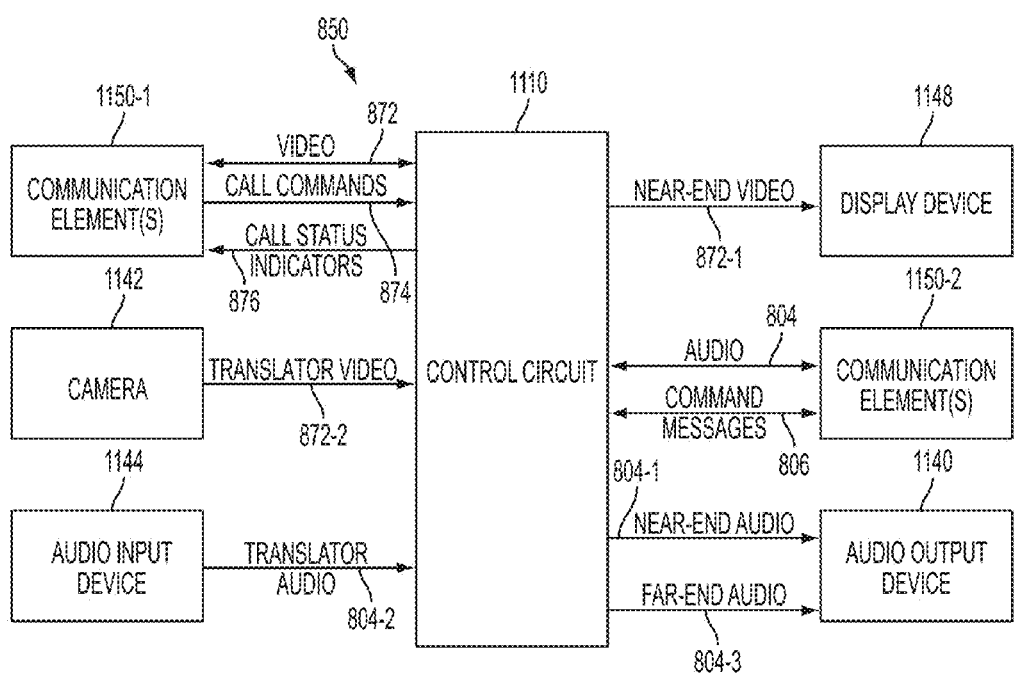
FIG. 11 is a simplified block diagram of the relay service of FIG. 8.

FIG. 11 is a simplified block diagram of the relay service 850 of FIG. 8. Referring to FIGS. 8 and 11 together, the relay service 850 may include a computing device 200, as discussed in more detail above with respect to FIG. 2. For example, the relay service 850 may comprise a control circuit 1110 including one or more processors 210, a memory 220, and a storage 240, as discussed above with respect to FIG. 2. Also, the relay service 850 may comprise user interface elements 230, including a camera 1142, an audio input device 1144, a display device 1148, and an audio output device 1140, each operably coupled to the control circuit 1110. The camera 1142, the audio input device 1144, the display device 1148, and the audio output device 1140 may be similar to the camera 942, the audio input device 944, the display device 948, and the audio output device 940 discussed above with respect to FIG. 9. Furthermore, the relay service 850 may comprise one or more communication elements 1150-1, 1150-2 operably coupled to the control circuit 1110, similar to the one or more communication elements 250 discussed above with respect to FIG. 2.

In operation, video communication may be established between the relay service 850 and the video endpoint 892. For example, the relay service 850 may send a request for a video communication session to the video endpoint 892 responsive to an audibly-capable user at the audio endpoint 812 calling the relay service 850 to communicate with the audibly-impaired user of the video endpoint 892. The audibly-impaired user may accept the request, and video communication may be established between the relay service 850 and the video endpoint 892. Also, the relay service 850 may receive a request for a video communication session from the video endpoint 892. The translator may accept the request, and video communication may be established between the relay service 850 and the video endpoint 892. In addition, a video communication session may already be in progress. For example, an audio communication session between the relay service 850 and the audio endpoint 812 on behalf of the audibly-impaired user may be in progress, or terminated without terminating the video communication session between the video endpoint 892 and the relay service 812.

Also, audio communication may be established between the relay service 850 and the audio endpoint 812. During video communications between the relay service 850 and the video endpoint 892, the control circuit 1110 may receive the call commands 874 through the communication elements 1150-1. The control circuit 812 may execute the call commands 874 without intervention from the translator. Thus, the audibly-impaired user of the video endpoint 892 may control the audio communication between the relay service 895 and the audio endpoint 812. For example, the call commands 874 may direct the relay service 850 to send a request for an audio communication session to the audio endpoint 812. The control circuit 1110 may transmit the request through the communication elements 1150-2 via the command messages 806 to the audio endpoint 812. The audibly-capable user may accept the request, and audio communication may be established. Also, the relay service 850 may receive a request for an audio communication session from the audio endpoint 812 via the command messages 806. The audibly-impaired user (e.g., via the call commands 876) may accept the request, and audio communication may be established. Furthermore, the control circuit 1110 may receive call commands 874 from the video endpoint 892 through the communication elements 1150-1 directed to terminating the audio communication session (e.g., hanging up), putting the audio communication session on hold, and other call commands 874. The control circuit 1110 may execute the call commands 874 (e.g., via the command messages 806) without intervention from the translator.

The control circuit 1110 may also generate call status indicators 876 indicating a current status (e.g., ringing, connected, disconnected, etc.) of the audio communications between the relay service 850 and the audio endpoint 812. The call status indicators 876 may be generated from the command messages 806, the audio 804, or a combination thereof. In some embodiments, the control circuit 1110 may be configured to determine the status of the audio communications, and indicate the status to the video endpoint 892 via the call status indicators 876. For example, the call status indicators 876 may indicate that the current status of the audio communications is "ringing" if the control circuit 1110 determines from the command messages 806 that a request to participate in audio communications has been sent to the audio endpoint 812, but has not been answered. Also, the call status indicators 876 may indicate that the current status is "connected" if the control circuit 1110 determines from the command messages 806 that the relay service 850 is participating in audio communications with the audio endpoint 812. In addition, the call status indicators 876 may indicate that the current status is "disconnected" if the control circuit 1110 determines from the command messages 806 that communications between the relay service 850 and the audio endpoint 812 have been terminated (e.g., by one of the audibly-impaired user at the video endpoint 892 and the audibly-capable user at the audio endpoint 812). In some embodiments, the call status indicators 876 may comprise at least a portion of the command messages 806, and the video endpoint 892 may be configured to determine the current status of the audio communications from the command messages 806. The control circuit 1110 may be configured to transmit the call status indicators 876 to the video endpoint 892 through the communication elements 1150-1 for displaying the status of the audio communications to the audibly-impaired user.

In operation, the control circuit 1110 may receive the near-end video 872 (e.g., video of the audibly-impaired user) and the near-end audio 804-2 (e.g., the audibly-impaired user's speech) from the video endpoint 892 through the communication elements 1150-1 via the video 872. The control circuit 1110 may also receive far-end audio 804-3 (e.g., the audibly-capable user's speech) from the audio endpoint 812 through the communication elements 1150-2 via the audio 804. The control circuit 1110 may cause the display device 1148 to display the near-end video 872-1 and the audio output device 1140 to convert the near-end audio 804-1 and the far-end audio 804-3 to acoustic energy. As a result, the translator at the relay service 850 may see and hear (if the audibly-impaired is speech-capable) the audibly-impaired user, and hear the audibly-capable user.

The camera 1142 may capture video images of the translator, and provide translator video 872-2 to the control circuit 1110. The audio input device 1144 may convert acoustic energy (e.g., the translator's speech) to electrical signals, and provide translator audio 804-2 corresponding to the acoustic energy to the control circuit 1110. The control circuit 1110 may transmit the translator video 872-2, the translator audio 804-2, and the far-end audio 804-3 to the video endpoint 892 through the communication elements 1150-1 via the video 872. As a result, the audibly-impaired user may see and hear (if the audibly-impaired user is hearing-capable) the translator at the relay service 850 and hear (if the audibly-impaired user is hearing-capable) the audibly-capable user via the video endpoint 892. The control circuit 1110 may also transmit the near-end audio 804-1 and the translator audio 804-2 to the audio endpoint 812 through the communication elements 1150-2 via the audio 804. As a result, the audibly-capable user may hear the translator and the audibly-impaired user (if the audibly-impaired user is speech-capable) via the audio endpoint.

Figure 12:
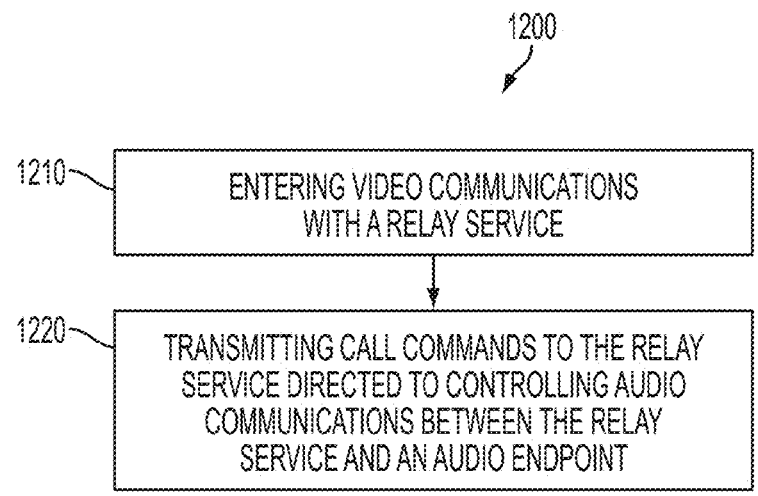
FIG. 12 is a simplified flowchart illustrating a method of operating the video endpoint of FIGS. 8 and 9.

FIG. 12 is a simplified flowchart 1200 illustrating a method of operating the video endpoint 892 of FIGS. 8 and 9. Referring to FIGS. 8, 9, and 12 together, at operation 1210, the method may comprise entering video communications with a relay service 850. Entering video communication with the relay service 850 may comprise transmitting a request to the relay service 850 to enter into a video communication session, and the request being accepted by a translator at the relay service 850. Entering video communication with the relay service 850 may also comprise receiving and accepting a request from the relay service 850 to participate in a video communication session.

At operation 1220, the method may comprise transmitting call commands 874 to the relay service 850 directed to controlling audio communications between the relay service 850 and an audio endpoint 812. For example, the call commands 874 may comprise commands directed to initiating, terminating, and otherwise controlling the audio communications between the relay service 850 and the audio endpoint 812. In some embodiments, commands directed to initiating the audio communications may include commands responsive to a user input. For example, the user input may comprise selection of a hearing-impaired party from a contacts list or a call history. Also, the user input may comprise a redial input.

Figure 13:
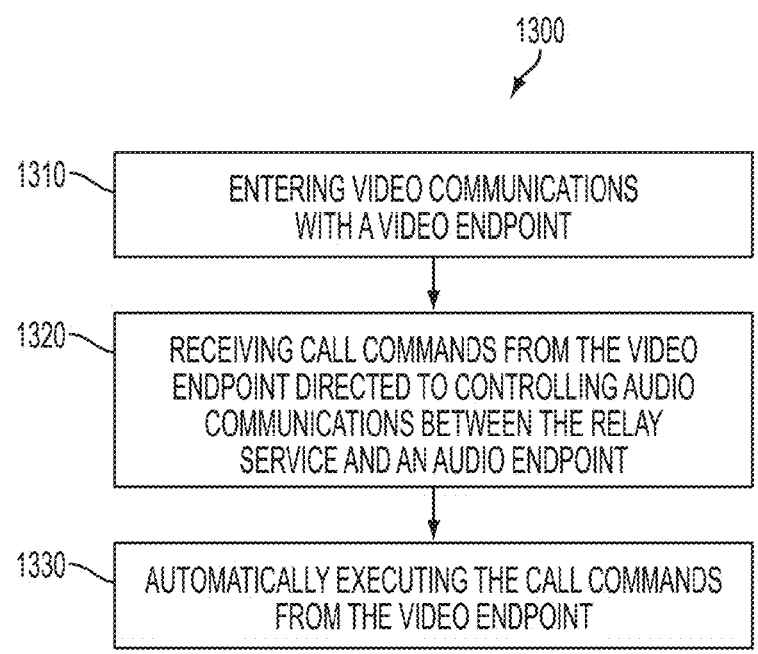
FIG. 13 is a simplified flowchart illustrating a method of operating the relay service of FIGS. 8 and 11.

FIG. 13 is a simplified flowchart 1300 illustrating a method of operating the relay service 850 of FIGS. 8 and 11. Referring to FIGS. 8, 11, and 13 together, at operation 1310, the method may comprise entering video communications with a video endpoint 892. Entering video communications with the video endpoint 892 may comprise transmitting a request to the video endpoint 892 to enter into a video communication session, and the request being accepted by an audibly-impaired user of the video endpoint 892. By way of non-limiting example, responsive to entering audio communications with an audio endpoint 812 operated by an audibly-capable user desiring to communicate with the audibly-impaired user, the relay service 850 may transmit the request to the video endpoint 892. Entering video communication with the video endpoint 892 may also comprise receiving and accepting a request from the video endpoint 892 to participate in a video communication session.

At operation 1320, the method may comprise receiving, at the relay service 850, call commands 874 from the video endpoint 892 directed to controlling audio communications between the relay service 850 and the audio endpoint 812. In some embodiments, receiving the call commands 874 may comprise receiving a first call command directing the relay service 850 to transmit a request to the audio endpoint 812 to establish audio communications between the relay service 850 and the audio endpoint 812. By way of non-limiting example, the first call command may direct the relay service 850 to transmit the request to establish audio communications with a last audio endpoint 812 the relay service 850 requested to establish communications with the relay service 850 on behalf of the video endpoint 892 (e.g., the first call command may include a redial command). Also by way of non-limiting example, the first call command may direct the relay service 850 to transmit the request to establish audio communications with an audio endpoint 812 indicated by a user input at the video endpoint 892 (e.g., via a call history, a contacts list, a telephone number input, etc.). In some embodiments, receiving the call commands 874 may comprise receiving a hang-up call command, directing the relay service 850 to terminate audio communications with the audio endpoint 812. Other call commands 874 are contemplated, such as, for example, call commands 874 directing the relay service 850 to put the audio communication session on hold.

At operation 1330, the method may comprise automatically executing the call commands 874 from the video endpoint 892. Accordingly, automatically executing the call commands 874 from the video endpoint 892 may comprise transmitting a request to the audio endpoint 812 to participate in an audio communication session with the relay service 850. Also, automatically executing the call commands 874 may comprise terminating the audio communication session with the audio endpoint 812.

Although the present invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A communication system, comprising a relay service comprising a control circuit configured to:
   facilitate translation services of an interpreter during a call between an audibly-impaired user of a video endpoint and an audibly-capable user of an audio endpoint;
   support a first connection between a video endpoint and the relay service to communicate video data therebetween during the call;
   support a second connection between the relay service and an audio endpoint to communicate audio data therebetween during the call;
   receive call control signals from the video endpoint over the first connection during the call; and
   automatically control audio communications over the second connection between the relay service and the audio endpoint during the call responsive to the call control signals being received from the video endpoint over the first connection and without interpreter intervention.

2. The communication system of claim 1, wherein the control circuit comprises:
   a memory device including machine-readable instructions directed to at least partially controlling the audio communications over the second connection between the relay service and the audio endpoint responsive to the call control signals received from the video endpoint over the first connection; and
   a processing circuit operably coupled to the memory device and configured to execute the machine-readable instructions.

3. The communication system of claim 1, wherein the call control signals comprise a command including information identifying another audio endpoint, wherein the control circuit is further configured to automatically cause a request to be sent from the relay service to the another audio endpoint to initiate audio communication between the relay service and the another audio endpoint over a new second connection responsive to the control circuit receiving the command.

4. The communication system of claim 1, wherein the call control signals comprise a command, and wherein the control circuit is further configured to automatically cause the audio communications over the second connection between the relay service and the audio endpoint to terminate responsive to the control circuit receiving the command without the first connection being terminated.

5. The communication system of claim 1, wherein the control circuit is further configured to:
   determine a current status of the audio communications over the second connection between the relay service and the audio endpoint; and
   transmit call status indications from the relay service to the video endpoint over the first connection, the call status indications indicating the determined current status for presenting to the audibly-impaired user.

6. The communication system of claim 5, wherein the call status indications indicate at least one current status selected from the group consisting of ringing, connected, disconnected, on hold, and busy.

7. A method of operating a communication system, the method performed by a relay service and comprising:
   conveying, with a relay service, video communications of an interpreter with a video endpoint over a first connection during a call;
   conveying, with the relay service, audio communications of the interpreter with an audio endpoint over a second connection during the call;
   receiving call commands during the call from the video endpoint over the first connection; and
   automatically executing the call commands without interpreter intervention to control the audio communications over the second connection between the relay service and the audio endpoint during the call.

8. The method of claim 7, further comprising:
   detecting a call status of the audio communications with the audio endpoint; and
   transmitting an indication of the call status to the video endpoint over the first connection.

9. The method of claim 8, wherein detecting the call status of the audio communications comprises determining the call status from command messages sent between the relay service and the audio endpoint.

10. The method of claim 8, wherein detecting the call status of the audio communications comprises determining the call status from audio signals received at the relay service from the audio endpoint.

11. A communication system, comprising a video endpoint configured for video communication with a relay service, the relay service configured to provide translation services of an interpreter during a call between an audibly-impaired user of the video endpoint and an audibly-capable user of an audio endpoint, the video endpoint comprising a user interface configured to receive user inputs from the audibly-impaired user during video communication between the video endpoint and the relay service over a first connection during the call, wherein the video endpoint is further configured to transmit call commands to the relay service over the first connection during the call responsive to the user inputs, the call commands directed to automatically triggering controls at the relay service without interpreter intervention that control audio communications over a second connection between the relay service and the audio endpoint during the call.

12. The communication system of claim 11, wherein the video endpoint is configured to transmit a first command to the relay service over the first connection during the call, the first command directed to triggering the relay service to automatically transmit a request for audio communication to another audio endpoint responsive to a first user input without first terminating the first connection between the video endpoint and the relay service.

13. The communication system of claim 12, wherein:
   the first user input comprises a redial input; and
   the another audio endpoint comprises a last audio endpoint the relay service called on behalf of the video endpoint.

14. The communication system of claim 12, wherein:
   the first user input comprises a redial input;
   the user interface is configured to present a list of selectable identifiers corresponding to a predetermined number of audio endpoints the relay service most recently called on behalf of the video endpoint responsive to the redial input; and
   the first command indicates one of the predetermined number of audio endpoints that corresponds to a selected one of the list of selectable identifiers.

15. The communication system of claim 12, wherein:
   the user interface is configured to present a list of selectable contacts corresponding to a plurality of audio endpoints;
   the first user input comprises a selection of one of the selectable contacts; and
   the first command indicates one of the plurality of audio endpoints corresponding to a selected one of the list of selectable contacts.

16. The communication system of claim 15, wherein the list of selectable contacts corresponding to the plurality of audio endpoints comprises a call history.

17. The communication system of claim 11, wherein the user interface comprises a graphical user interface configured to:
   display a unique identifier corresponding to a first audio endpoint to be called by the relay service on behalf of the audibly-impaired user; and
   enable the audibly-impaired user to edit the unique identifier to correspond to a second audio endpoint, before directing the relay service to establish audio communications with a second audio endpoint corresponding to the edited unique identifier.

18. The communication system of claim 17, wherein the unique identifier is a telephone number.

19. The communication system of claim 11, wherein the video endpoint is configured to receive call status indications from the relay service, wherein the call status indications indicate a status of the audio communications between the relay service and the audio endpoint on behalf of the audibly-impaired user, and wherein the video endpoint is configured to present the status of the audio communications to the audibly-impaired user.

20. The communication system of claim 19, wherein the call status indications indicate at least one status selected from the group consisting of ringing, connected, disconnected, busy, and on hold.

21. The communication system of claim 19, wherein the call status indications comprise call command messages transmitted between the relay service and the audio endpoint, and the video endpoint is further configured to analyze the call command messages to determine the status of the audio communications between the relay service and the audio endpoint.

22. The communication system of claim 11, wherein the user interface comprises a graphical user interface configured to display a hang-up option, wherein the video endpoint is configured to send a first command directing the relay service to automatically terminate the audio communications over the second connection between the relay service and the audio endpoint without terminating the first connection responsive to detection of a selection of the hang-up option.

23. The communication system of claim 19, wherein the call status indications indicate who is speaking between the interpreter at the relay service and the audibly-capable user.

24. The communication system of claim 1, wherein the call control signals include an in-call hang-up command to terminate the second connection between the relay service and the audio endpoint without terminating the first connection between the video endpoint and the relay service.

25. The communication system of claim 24, wherein the in-call hang-up command causes the second connection between the relay service and the audio endpoint to terminate without terminating the first connection between the relay service and the video endpoint.

26. The communication system of claim 25, wherein the call control signals include an in-call call command to initiate a new second connection between the relay service and another audio endpoint.

27. The communication system of claim 1, wherein the call control signals include an in-call hold command to place the audio endpoint on hold with the relay service over the second connection during the call.

* * * * *